UNITED STATES PATENT OFFICE.

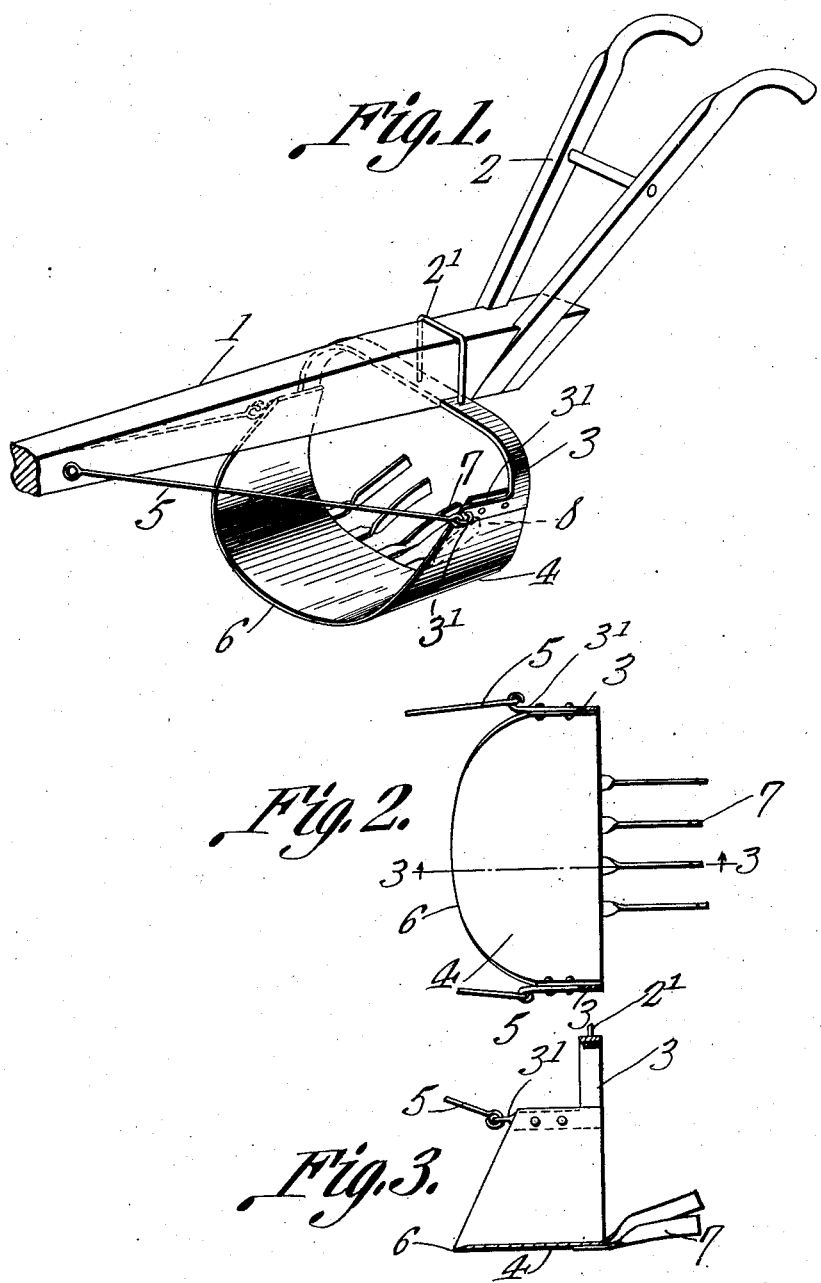

THOMAS J. WHITTINGTON, OF GLOSTER, MISSISSIPPI.

PEANUT-DIGGER.

1,010,555. Specification of Letters Patent. Patented Dec. 5, 1911.

Application filed January 4, 1911. Serial No. 600,746.

*To all whom it may concern:*

Be it known that I, THOMAS J. WHITTINGTON, a citizen of the United States, residing at Gloster, in the county of Amite and State of Mississippi, have invented a new and useful Peanut-Digger, of which the following is a specification.

This invention has relation to peanut diggers and consists in the novel construction and arrangement of its parts as hereinafter shown and described.

At the time peanuts are dug preparatory to harvesting it is desirable to leave in the soil as much as possible of the tap root in order that the soil may be fertilized and maintained in a good condition for future planting. It is also desirable to retain in the soil as much as possible of the lateral root but of course it is essential to dig with the nuts so much of the lateral root as is necessary to feed sap to the nuts while they are ripening preparatory to cleaning for market purposes. Bearing in mind the desirability of retaining in the soil maximum amounts of both of the kinds of the roots and of removing with the nuts just so much of the roots as is necessary to mature the ripening of the same prompts the present invention.

The digger includes a beam having handles attached to its rear end portion and with which is connected a share of general U-shaped configuration in edge elevation. The share is provided with a forward cutting edge. Twisted blades are attached to the rear edge portion of the share. In operation the share is designed to pass under the nuts and cut the tap roots close to the nuts while the twisted blades at the rear portion of the share cut under the lateral roots and sever the same leaving so much of the lateral root adhering to the nuts as is necessary and desirable and the portions left clinging to the nuts, together with the nuts are lifted above the surface of the soil by the said blades.

In the accompanying drawings:—Figure 1 is a perspective view of the peanut digger. Fig. 2 is a top plan view of the share of the digger with attached parts. Fig. 3 is a longitudinal sectional view of the share of the digger cut on the line 3—3 of Fig. 2.

The digger consists of a beam 1 to the rear end of which are attached handles 2. A standard 3 in the form of a yoke is attached to the rear portion of the beam 1 by means of a U-shaped clamp bolt 2' which straddles the beam and passes through the intermediate portion of the said standard. The standard 3 is provided at its ends with forwardly disposed extremities 3'. The share 4 is attached at its ends to the extremities 3' of the standard 3 and the said share in edge elevation is approximately U-shaped. Braces 5 are connected at their rear ends with the forward ends of the extremities 3' of the standard 3 and at their forward ends the said braces are connected with the sides of the beam 1. The share 4 is provided with a forward cutting edge 6. Twisted blades 7 are attached to the rear portion of the share 4 and project beyond the rear ends thereof. The blades 7 at one side of the median line of the share 4 are twisted outwardly in one direction, while the blades 7 at the other side of the said median line are twisted outwardly in the opposite direction. That is to say the twists of the blades are disposed as indicated, while the blades in general are disposed rearwardly at right angles to the rear edge of the share 4. The rear portions of the blades 7 are upwardly disposed with relation to the share 4 and the intermediate blades are not inclined so precipitously as the side blades as shown in Fig. 3 the object of which will be hereinafter explained.

In operation the digger is passed along a row of peanut plants and the share 4 at its cutting edge 6 will sever the tap roots of the plants leaving the major portions of the roots in the ground. As the top soil is severed from the sub-soil and passes back over the upper surface of the share 4, the nuts, together with the lateral roots are carried upon the upper edges of the blades 7, and the said blades 7 sever the major portions of the lateral roots from the nuts. Just so much of the root is left upon the nut as to ripen the same by feeding the sap to the nuts prior to cleaning for market purposes. By reason of the fact that the rear end portions of the blades 7 are upwardly disposed the nuts as the lateral roots are cut are pushed in an upright direction and are forced at and above the surface of the soil. Consequently, the nuts may be readily gathered. By reason of the fact that the intermediate blades 7 are not inclined so precipitously as the outer blades, the lateral roots are cut by the outer blades nearer the surface of the soil than the said roots that are cut by the said intermediate blades. Therefore, it may be assured that each cluster of nuts will have sufficient lateral roots adhering thereto to properly feed the sap to the same.

Having described the invention what I claim as new and desire to secure by Letters Patent is:—

1. A peanut digger comprising a beam, a standard in the form of a yoke attached thereto and having laterally disposed extremities, a share approximately U-shaped in edge elevation secured at its ends to the extremities of the standard and a series of flat knife-like lifting and cutting blades attached to the share and projecting behind the rear edge thereof, the outer blades having their outer ends curved upwardly at a greater angle than the intermediate blades.

2. A peanut digger comprising a beam, a standard in the form of a yoke attached thereto and having laterally disposed extremities, a share approximately U-shaped in edge elevation attached at its ends to the extremities of the standard, braces secured at their rear ends to the extremities and at their forward ends to the beam, and a series of flat knife-like lifting and cutting blades attached to the share and projecting behind the rear edge thereof, the outer blades having their outer ends curved upwardly at a greater angle than the intermediate blades.

3. A peanut digger comprising a beam, a standard in the form of a yoke attached thereto and having laterally disposed extremities, a share approximately U-shaped in edge elevation secured at its ends to the extremities of the standard, a series of combined flat lifting and cutting blades secured to the share and projecting behind the rear edge thereof, the outer blades having their outer ends curved upwardly at a greater angle than the intermediate blades, said blades being formed of strips twisted from the horizontal at the share and into vertical planes at their rear ends, the twists of the blades at one side of the share being oppositely disposed from the twists of the blades at the other side.

4. The combination in a peanut digger, of a beam, a yoke-shaped standard having terminals provided with forwardly projecting and right angled and parallel terminals, a brace rod connected to the beam and to the extreme end of each right angled terminal of the yoke for holding said yoke relatively to the beam, a share approximately U-shaped in edge elevation having its forward end curved and its rear end straight to provide narrow upper edges, means for attaching said narrow upper edges to the respective right angled terminals of the standards, and a series of flat strips having their forward ends connected to the underside at the rear edge of the share, said strips being twisted intermediate of their ends and having their outer free ends at right angles to the body of the strips, all of the outer ends of said strips being bent upwardly, the center ones being at the lesser angle than the outer ones of the series.

In testimony that I claim the foregoing as my own, I have heretofore affixed my signature in the presence of two witnesses.

THOMAS J. WHITTINGTON.

Witnesses:
W. P. WEBB,
H. V. SEIDENSPINNER.

Copies of this patent may be obtained for five cents each, by addressing the "Commissioner of Patents, Washington, D. C."